US 6,620,278 B1

(12) United States Patent
Harrold et al.

(10) Patent No.: US 6,620,278 B1
(45) Date of Patent: Sep. 16, 2003

(54) DRIP TAPE MANUFACTURING PROCESS

(75) Inventors: Charles R. Harrold, Walla Walla, WA (US); Theodore J. Bren, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 53 days.

(21) Appl. No.: 09/708,605

(22) Filed: Nov. 9, 2000

Related U.S. Application Data

(60) Provisional application No. 60/197,607, filed on Apr. 18, 2000.

(51) Int. Cl.[7] .......................... B29C 47/02; B05B 15/00
(52) U.S. Cl. .............. 156/203; 156/244.13; 156/272.8; 156/275.1; 264/173.15; 264/173.14
(58) Field of Search ................. 156/203, 200, 156/244.11, 244.12, 244.13, 202, 195, 275.1, 272.8; 264/173.14, 173.15

(56) References Cited

U.S. PATENT DOCUMENTS

| | | | |
|---|---|---|---|
| 2,484,965 A | 10/1949 | Slaughter | |
| 2,575,138 A | 11/1951 | Slaughter | |
| 3,467,142 A | 9/1969 | Boyle et al. | |
| 3,478,138 A | 11/1969 | Friesner | |
| 3,816,206 A | 6/1974 | Coster | |
| 3,870,236 A | 3/1975 | Sahagun-Barragan | |
| 3,895,085 A | 7/1975 | Suzuki et al. | |
| 3,896,999 A | 7/1975 | Barragán | |
| 4,009,832 A | 3/1977 | Tiedt | |
| 4,047,995 A | 9/1977 | Leal-Diaz | |
| 4,060,200 A | 11/1977 | Mehoudar | |
| 4,095,084 A | 6/1978 | Shutt | |
| 4,247,051 A | 1/1981 | Allport | |
| 4,285,472 A | 8/1981 | Okada et al. | |
| 4,323,533 A | 4/1982 | Bramhall | |
| 4,430,020 A | 2/1984 | Robbins | |
| 4,473,191 A | 9/1984 | Chapin | |
| 4,473,525 A | 9/1984 | Drori | |
| 4,555,282 A | 11/1985 | Yano | |
| 4,642,152 A | 2/1987 | Chapin | |
| 4,702,787 A | * 10/1987 | Ruskin et al. | 156/244.25 |
| 4,722,759 A | 2/1988 | Roberts et al. | |
| 4,749,535 A | 6/1988 | Matsuda | |
| 4,874,132 A | 10/1989 | Gilead | |
| 4,880,167 A | 11/1989 | Langa et al. | |
| 4,984,739 A | 1/1991 | Allport | |
| 5,022,940 A | 6/1991 | Mehoudar | |
| 5,076,498 A | 12/1991 | Townsend | |
| 5,122,044 A | 6/1992 | Mehoudar | |
| 5,123,984 A | 6/1992 | Allport et al. | |
| 5,163,622 A | 11/1992 | Cohen | |

(List continued on next page.)

FOREIGN PATENT DOCUMENTS

WO    WO 97/21874    * 6/1997

Primary Examiner—Jeff H. Aftergut
Assistant Examiner—Barbara J Mussa
(74) Attorney, Agent, or Firm—Nixon & Vanderhye P.C.

(57) ABSTRACT

A method of forming tubular irrigation drip tape includes the steps of
 a) extruding a web of material having a pair of longitudinally extending, substantially parallel marginal edges;
 b) heating a center area of the web between and substantially parallel to the marginal edges utilizing a first focused infrared heating device;
 c) applying one or more secondary flow path components to the center area;
 d) heating the marginal edges, utilizing a second and third focused infrared heating device;
 e) folding the web such that the marginal edges overlap to form a seam; and
 f) applying pressure to the seam.

17 Claims, 2 Drawing Sheets

U.S. PATENT DOCUMENTS

| | | |
|---|---|---|
| 5,181,532 A | 1/1993 | Brodefors et al. |
| 5,203,503 A | 4/1993 | Cohen |
| 5,207,386 A | 5/1993 | Mehoudar |
| 5,246,171 A | 9/1993 | Roberts |
| 5,271,786 A | 12/1993 | Gorney et al. |
| 5,282,578 A | 2/1994 | DeFrank |
| 5,282,916 A | 2/1994 | Bloom |
| 5,318,657 A | 6/1994 | Roberts |
| 5,324,371 A | 6/1994 | Mehoudar |
| 5,324,379 A | 6/1994 | Eckstein |
| 5,333,793 A | 8/1994 | DeFrank |
| 5,387,307 A | 2/1995 | Roberts |
| 5,458,712 A | 10/1995 | DeFrank |
| 5,522,551 A | 6/1996 | DeFrank et al. |
| 5,522,954 A * | 6/1996 | Bennett et al. .............. 239/542 |
| 5,634,595 A | 6/1997 | DeFrank et al. |
| 5,688,072 A | 11/1997 | Meyer et al. |
| 5,722,601 A | 3/1998 | DeFrank et al. |
| 6,120,634 A | 9/2000 | Harrold et al. |
| 6,350,500 B1 * | 2/2002 | Drummond et al. ....... 428/35.7 |

* cited by examiner

DRIP TAPE MANUFACTURING PROCESS

The application claims the benefit of U.S. Provisional Application No. 60/197,607, filed Apr. 18, 2000, the entire content of which is hereby incorporated by reference in this application.

TECHNICAL FIELD

This invention relates generally to the manufacture of thin, flexible tubing and specifically, to the manufacture of flexible drip hose or tape used in agricultural irrigation.

BACKGROUND

Drip irrigation hose or tape has been available for several years. Typically, agricultural drip tapes are formed from relatively thin, flexible, continuous plastic strips folded over and seamed along a longitudinal edge to establish a primary flow path. One or more secondary flow paths are typically formed within the primary flow path by fixing discrete emitter devices along the length of the tape or hose, or by applying parallel strips of plastic material within the hose interior (for example, in the area of the longitudinal edge overlap) to form a secondary flow path. Generally, the primary flow path is connected to the water supply with inlets and outlets to and from the secondary flow path, so that water flows from the primary path to the secondary flow path, and then out of the secondary path outlets in a controlled fashion. Some tape or hose constructions incorporate turbulence inducing regions in the secondary flow path to prevent clogging and reduce the sensitivity of the flow rate to pressure changes.

Drip irrigation hoses or tapes are well represented in the patent literature, and examples may be found in U.S. Pat. Nos. 3,870,236; 3,896,999; 4,009,832; 4,247,051; 4,430,020; 4,473,191; 4,874,132; 4,880,167; 4,984,739; 5,163,622; 5,181,532; 5,203,503; 5,207,386; 5,282,578; 5,333,793; and 5,688,072.

Despite the wealth of innovative drip irrigation technology, significant areas of concern remain relating to reliability and cost. For drip tape to be effective and commercially viable, it is essential that the secondary flow path not become clogged with solid matter in the water supply, or by outside debris blocking the outlets. At the same time, drip tape must be economical to manufacture.

In commonly owned U.S. Pat. No. 6,120,634 issued Sep. 9, 1997, there is disclosed a new and improved drip tape formed by a strip of extruded flexible polyethylene (PE) material folded over, heated and seamed along overlapped longitudinal edges. Interiorly of the tape, and in an area remote from the overlapped seam, there is a pre-formed longitudinally extending plastic bead or strip which defines a series of axially spaced secondary flow paths. The secondary flow path bead or strip is extruded onto a heated portion of the tape, prior to seaming.

As described in the '634 patent (the entirety of which is incorporated herein by reference), each secondary flow path has a secondary flow channel including inlet, turbulence inducing, and outlet regions, all of which are preformed on one side of the hot melt bead or strip. The pattern side of the bead is applied face down on the sheet so that the sheet wall itself closes the secondary flow channel except for a plurality of inlets formed in the bead at longitudinally spaced locations along the inlet region. These inlets are arranged perpendicular to the longitudinal axis of the tape, and thus also perpendicular to the secondary flow channel.

The inlet region leads to a turbulence inducing region formed by a series of peaks and valleys on opposite sides of the secondary flow channel, in longitudinally offset relationship so that the peaks on one side of the secondary flow channel in this region project towards the valleys on the opposite side of the flow channel.

Downstream of the turbulence inducing region, an outlet region is provided which communicates with an elongated slit in the tape wall which allows the water in the secondary flow path to escape in a controlled drip-like fashion. The outlet region, or reservoir, is otherwise axially closed in the downstream direction, thus isolating the path from the inlet region of the next adjacent downstream secondary flow path, and thus also forcing all water to exit via the elongated slit in the tape wall.

The manufacturing process as described in the '634 patent has proven to be generally satisfactory, but faster production speeds are desired.

SUMMARY OF THE INVENTION

This invention relates to an improved process for seaming overlapped edges of a flexible strip or web that forms the primary flow path in an agricultural drip irrigation tape. In addition, the invention relates to facilitating the adhesion of a pre-formed, secondary flow path strip within the interior of the tube. The preferred utilization of focused infrared heating, combined with other measures to facilitate bonding of both the secondary flow path to the tape and the overlapped marginal edges of the tape, have resulted in significantly greater production speeds.

In one exemplary embodiment, the flexible strip or web is comprised of a blend of high and linear low density polyethylene material (HDPE and LLDPE, respectively) continuously extruded from a first extrusion head or die. Simultaneously, LLDPE material is co-extruded from a second and third extruder onto upper and lower surfaces of respective marginal edges of the web of material. By co-extruding the LLDPE material along the marginal edges, bonding of subsequently overlapped marginal edges is facilitated, particularly at high production speeds. In addition, flow from a fourth extruder is co-extruded onto a center area of the upper surface of the web of material. This narrow center strip is also comprised of LLDPE material, and facilitates the adhesion of a pre-formed secondary flow path strip to the web. Because of the molten state of the extrudates, all three co-extruded strips are bonded or welded to the web, and the marginal edge strips and center strip are sufficiently thin that they are substantially flush with the web.

In a second exemplary embodiment, the additional marginal and center area extrusions of LLDPE material may be omitted. In other words, the marginal edges remain the blended material from which the web is made, and the secondary flow path is bonded directly to the web without the aid of an intermediate center strip. This second embodiment is viable particularly at lower production speeds.

In both embodiments, it is preferred that heat be applied to the web along the center area, where the secondary flow path strip is to be bonded to the web, and to the marginal edges of the web just prior to the folding and seaming, by means of focused infrared heating.

It will be appreciated that the co-extrusion of narrow strips onto the marginal edges of the web to facilitate bonding or seaming of the edges can be performed independently of the manner in which secondary flow paths (or even discrete flow emitters) are added to the tape. Conversely, the co-extrusion of a sealing or bonding strip onto the center area of the web to facilitate bonding of a secondary flow path strip can be done independently of the manner in which the overlapped marginal edges of the web are seamed.

In its broader aspects, therefore, the present invention relates to a method of forming a tubular irrigation drip tape comprising a) extruding an elongated, continuous web of polymeric resin material; b) heating marginal edges of the web by exposure to a focused infrared heating unit; c) folding the web such that the marginal edges of the web are overlapped; and d) pressing the overlapped marginal edges to thereby bond the overlapped marginal edges together.

In another aspect, the invention relates to a method of forming tubular irrigation drip tape having a primary flow path and a secondary flow path comprising:
  a) extruding a web of material having a pair of longitudinally extending, substantially parallel marginal edges;
  b) heating a center area of the web between and substantially parallel to the marginal edges utilizing a first focused infrared heating device;
  c) applying one or more secondary flow path components to the center area;
  d) heating the marginal edges, utilizing a second focused infrared heating device;
  e) folding the web such that the marginal edges overlap to form a seam; and
  f) applying pressure to the seam.

In still another aspect, the invention relates to a method of forming a tubular irrigation drip tape comprising:
  a) coextruding an elongated continuous web of one material, with marginal edges of another material;
  b) extruding a center strip of material along a center area of the web, between the marginal edges;
  c) heating the center strip and depositing a secondary flow path strip onto the center strip;
  d) applying pressure to the center strip and the secondary flow path strip to thereby bond the secondary flow path strip to the web;
  e) heating the marginal edges;
  f) folding the web to cause the marginal edges to overlap; and
  g) applying pressure to the overlapped marginal edges.

Additional advantages of the disclosed invention will become apparent from the detailed description that follows.

DETAILED DESCRIPTION OF THE INVENTION

Figure 1:
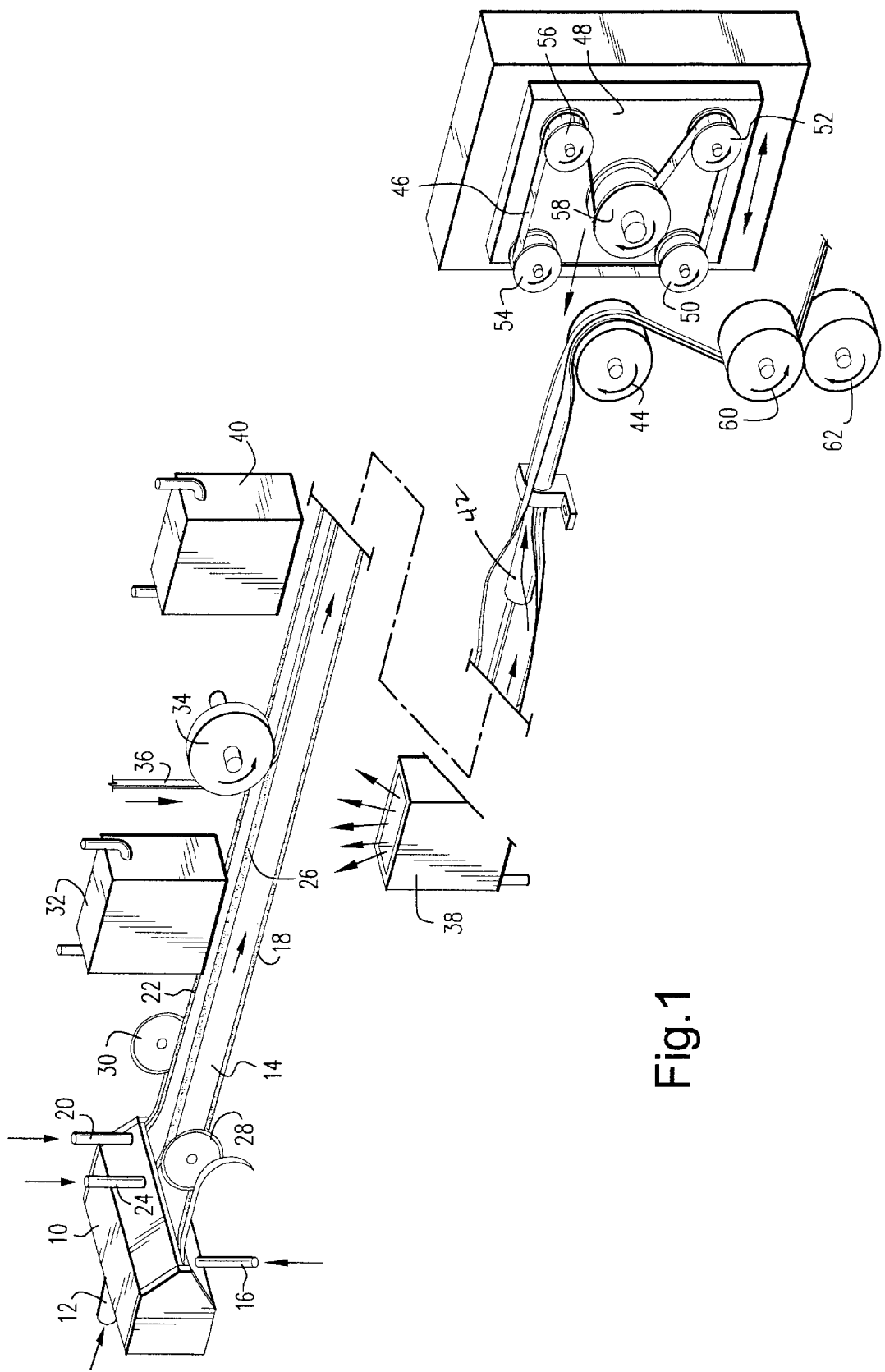
FIG. 1 illustrates in schematic form, a drip tape manufacturing process in accordance with the invention.

With reference to FIG. 1, and in accordance with a first exemplary embodiment, molten plastic material from a first extruder (not shown) enters a first extrusion head or die 10 at an inlet 12 to produce a thin, elongated web 14 that will eventually be folded and seamed to form a tubular drip tape. Molten plastic sealing material from a second extruder (not shown) enters the head or die 10 at another inlet 16 and is co-extruded onto the lower or under surface of the web 12 along a first marginal edge 18 thereof while, simultaneously, molten plastic sealing material from a third extruder (not shown) enters the head or die 10 at a third inlet 20 and is co-extruded onto the upper surface of the web 14 along a second and opposite marginal edge 22. In addition, molten material from a fourth extruder (not shown) enters the head or die 10 at a fourth inlet 24 and is co-extruded onto the web 12 as a center bead or strip 26, the latter located along the center area of the web 14, between and parallel to the marginal edges 18 and 22. The formulation of specific materials are understood to be product dependent and may be a blend of various low and high density polymeric resins. For example, web 14 may be a blend of LLDPE and HDPE, while edges 18, 22 and center bead 26 may be LLDPE.

The depth of the edges 18, 22 and center strip 26 are controlled by the output of their respective extruder, while the width and location of edges 18, 22 and center strip 26 are controlled by internal porting and manifolding inside the die 10. Both parameters are determined by product specifications, as would be understood by those of ordinary skill in the art.

The continuously generated web 14 with marginal edges 18, 22 and center strip 26 is moved through a station where the marginal edges 18, 22 are trimmed to width by conventional cutting disks or wheels 28, 30.

The continuous web 14 is then moved under a focused infrared heating unit 32, commercially available from, for example, Research Incorporated. The infrared unit 32 is adjusted vertically and horizontally such that the beam from the unit 32 is directly focused on center strip 26 such that the energy from the focused beam heats the center strip 26 to the required bonding temperature. Immediately thereafter, a continuous, remotely generated, geometric secondary flow path strip 36 of generally similar material is deposited directly onto the center strip 26 and bonded to the web 14 as a result of the combination of heat and pressure applied by a transfer drum or roll 34. The size and output of the focused infrared unit is determined by energy needed to successfully perform the bonding process, as determined by material section and linear speed of the web.

The secondary flow path strip 36 may contain a single, continuous secondary flowpath or preferably, multiple, preformed secondary flow paths, the specific geometry of which is not important to this invention. The secondary flow path may be configured as disclosed in commonly owned U.S. Pat. No. 6,120,634, but any other suitable configuration will suffice for purposes of this invention. In any event, the secondary flow path would preferably include an inlet, turbulence inducing and outlet regions, with or without pressure compensation features.

With further continuous movement, the web 14 is moved to another station where focused infrared beams from infrared units 38, 40 (that are similar to unit 26), are adjusted vertically and horizontally to focus directly on the marginal edges 18, 22, respectively.

Figure 2:
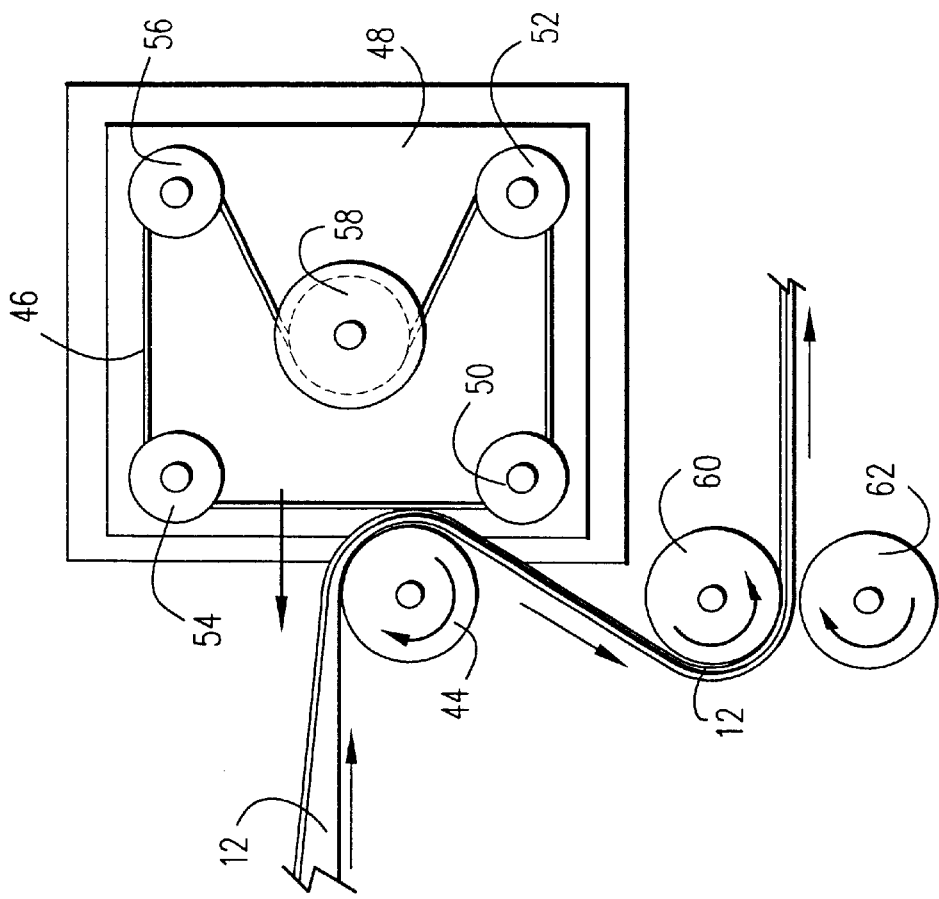
FIG. 2 is a front elevation of a roller seaming unit taken from FIG. 1.

Energy from the focused infrared units 38, 40 generates sufficient energy to heat to edges 18, 22 to the required bonding temperature. As web 14 is sized and folded about a mandrel 42, the edges 18, 22 in their heated state are overlapped to form a seam. As the overlapped edges exit the folding station, they are pressed against a roller 44 by a continuous belt 46 which is mounted on a slide 48 (via rollers 50, 52, 54, 56 and 58), movable toward or away from the roller 44. As best seen in FIG. 2, pressure from the continuous belt 46 holds the web 14 against roller 44 for sufficient time to create a controlled, closed, bonded, watertight lap or seam along the length of the web. As the closed tubular product exits the station, it travels through a pair of rollers 60, 62 to complete the initial stages of the process.

It will be appreciated that further processing is employed to, for example, form outlets in the web 14 that are aligned with the appropriate part of the secondary flow paths in the strip 36. In use, briefly, water entering the drip tape will flow through inlets in the strip 36 to the secondary flow path, flow along the secondary flow path and exit the drip tape via the above mentioned outlets.

It will be appreciated further that the use of focused infrared heating is particularly advantageous in that it permits bonding at both high and low production speeds. As already mentioned herein, forming marginal edges 18 and 22 and center strip 26 of different material (preferably LLDPE) facilitates bonding at higher speeds.

In a second exemplary embodiment and for lower production speeds, the second, third and fourth extrudates may be omitted. Thus, the marginal edges of the web 14 remain a blend of various high and low density polymeric resins. In addition, the secondary flow path strip 36 containing the secondary flow path may be bonded directly to the web 14. Nevertheless, production speeds greater than current speeds with air or non-focused radiant heating are possible.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a tubular irrigation drip tape comprising:
   a) co-extruding an elongated, continuous web of polymeric resin material, along with marginal edges of said web, said marginal edges being of a different material than said web;
   b) heating said marginal edges of the web while continuously moving said web through a focused infrared heating unit;
   c) folding the web such that the marginal edges of the web are overlapped; and
   d) pressing the overlapped marginal edges to thereby bond the overlapped marginal edges together.

2. The method of claim 1 wherein, prior to step b), a center strip of material is extruded onto a center area of the web, between said marginal edges, and a secondary flow path strip of material incorporating at least one secondary flow path is deposited on said center strip.

3. The method of claim 2 wherein said center strip is comprised of linear low density polyethylene.

4. The method of claim 2 wherein said center area is heated with another focused infrared heating unit before the secondary flow path strip is deposited on said center strip.

5. The method of claim 4 wherein said secondary flow path strip is pressed onto said web after said center area is heated.

6. The method of claim 1 wherein said different material is linear low density polyethylene.

7. The method of claim 1, wherein prior to step b), said marginal edges are trimmed.

8. The method of claim 1 wherein step d) is carried out by engaging an endless belt with a roller about which the folded web passes.

9. A method of forming tubular irrigation drip tape having a primary flow path and a secondary flow path comprising:
   a) co-extruding a web of material along with a pair of longitudinally extending, substantially parallel marginal edges of said web, said marginal edges being of a different material than said web;
   b) heating a center area of said web between and substantially parallel to said marginal edges while moving said web through a station including a first focused infrared heating device;
   c) applying one or more secondary flow path components to said center area;
   d) heating said marginal edges while moving said web through another station including a second focused infrared heating device;
   e) folding said web such that said marginal edges overlap to form a seam; and
   f) applying pressure to said seam.

10. The method of claim 9 wherein step c) is carried out by extruding a continuous secondary flow path strip of material onto said web in said center area, said secondary flow path strip having a plurality of secondary flow paths formed therein.

11. The method of claim 10 wherein, after step c), pressure is applied to said secondary flow path strip.

12. The method of claim 9 wherein, prior to step d), said marginal edges are trimmed.

13. The method of claim 9 wherein said web is comprised of a blend of linear low and high density polyethylene.

14. A method of forming a tubular irrigation drip tape comprising:
   a) coextruding an elongated continuous web of one material, with marginal edges of another material;
   b) extruding a center strip along a center area of said web, between said marginal edges;
   c) heating said center strip and depositing a secondary flow path strip incorporating at least one pre-formed secondary flow path onto said center strip;
   d) applying pressure to said center strip and said secondary flow path strip to thereby bond said secondary flow path strip to said web;
   e) heating said marginal edges;
   f) folding said web to cause said marginal edges to overlap; and
   g) applying pressure to said overlapped marginal edges to thereby bond said marginal edges together.

15. The method of claim 14 wherein steps c) and e) are carried out with focused infrared heating.

16. The method of claim 14 wherein said web is comprised of a blend of linear low and high density polyethylene.

17. The method of claim 16 wherein said another material is linear low density polyethylene.

* * * * *

UNITED STATES PATENT AND TRADEMARK OFFICE
CERTIFICATE OF CORRECTION

PATENT NO. : 6,620,278 B1
DATED : September 16, 2003
INVENTOR(S) : Harrold et al.

It is certified that error appears in the above-identified patent and that said Letters Patent is hereby corrected as shown below:

Column 3,
Line 65, delete "web 12" and insert -- web 14 --.

Column 4,
Line 6, delete "web 12" and insert -- web 14 --.
Line 51, delete "unit 26" and insert -- unit 32 --.

Column 5,
Lines 4 and 5, before "strip 36" insert -- path --.

Signed and Sealed this

Ninth Day of December, 2003

JAMES E. ROGAN
*Director of the United States Patent and Trademark Office*